United States Patent [19]

Heinen

[11] 4,245,445
[45] Jan. 20, 1981

[54] METHOD FOR MAKING A FIRE-PROOF PASSAGE AND PASSAGE OBTAINED THEREBY

[75] Inventor: Hans D. J. Heinen, Malmedy, Belgium

[73] Assignee: Intellectual Trade Cy S.A. Great Duchy of Luxemburg, Charlotte, Luxembourg

[21] Appl. No.: 873,815

[22] Filed: Jan. 31, 1978

[30] Foreign Application Priority Data

Feb. 1, 1977 [FR] France .................. 77 02738

[51] Int. Cl.² .................. F16L 5/00; E04B 5/48
[52] U.S. Cl. .................. 52/221; 52/744; 174/48; 285/47; 285/192
[58] Field of Search .................. 248/56; 52/221, 220, 52/232, 743, 744; 285/46, 47, 192; 174/48; 169/48

[56] References Cited

U.S. PATENT DOCUMENTS

| 2,314,950 | 3/1943 | Pope | 285/46 |
|---|---|---|---|
| 2,390,632 | 12/1945 | Abrams et al. | 285/47 |
| 3,162,412 | 12/1964 | McEntire | 285/192 X |
| 3,848,897 | 11/1974 | McClellan | 285/47 |
| 4,023,782 | 5/1977 | Eifer | 285/47 |
| 4,061,344 | 12/1977 | Bradley | 248/56 |
| 4,086,736 | 5/1978 | Landrigan | 52/221 |

FOREIGN PATENT DOCUMENTS

| 2162251 | 6/1973 | Fed. Rep. of Germany | 52/232 |
|---|---|---|---|
| 2441412 | 3/1976 | Fed. Rep. of Germany | 174/48 |
| 2503712 | 8/1976 | Fed. Rep. of Germany | 169/48 |
| 366045 | 12/1938 | Italy | 52/220 |

Primary Examiner—Alfred C. Perham
Attorney, Agent, or Firm—Blum, Kaplan, Friedman, Silberman and Beran

[57] ABSTRACT

There is described a method for passing through a wall or ceiling with elements such as electric cables, ducts, pipes, etc., whereby said wall has at least one passage opening for said elements or such an opening is made in said wall, which comprises making use of a cushion which is fireresistant enough, at least one surface of said cushion is covered with a fire-proof compound, said opening is closed with said cushion, a flange from fire-resisting material is arranged against at least one cushion surface for each element or element group, in such a way as to surround the element or element group, and the hollow space remaining inside the flange is filled with a fire-proof material.

25 Claims, 3 Drawing Figures

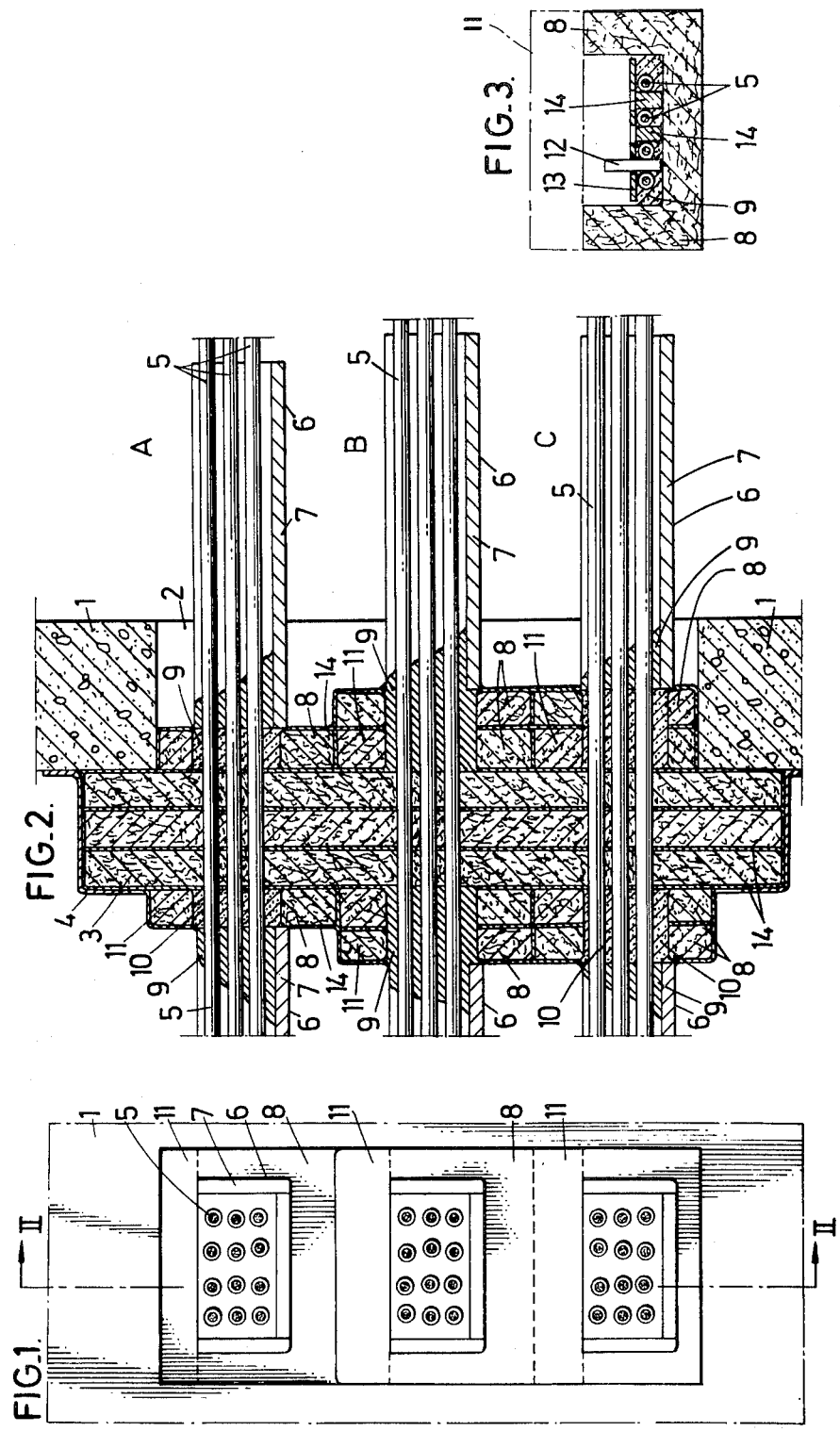

METHOD FOR MAKING A FIRE-PROOF PASSAGE AND PASSAGE OBTAINED THEREBY

This invention relates to a method for passing through a wall or ceiling with elements such as electric cables, ducts, pipes, etc., whereby said wall has at least one passage opening for said elements or such an opening is made in said wall.

The field of the art of the invention relates to the fire-proofing of a passage for some elements from one enclosure to another and pertains to the problems attached to the fighting of the fire progress from one space or room to an adjacent space or room.

The invention has for an object to solve the problems which are met when making a passage which is absolutely fire-tight or which at least slows down the fire, whatever the nature of those elements passing through a wall, a particular embodiment of the invention applies to the passage of electric cables inside a generating station.

The resistance to fire comprises three main aspects which are to be taken into consideration:
 (a) tightness to fire
 (b) limitation of the temperature which can appear on that surface which is not exposed to the fire
 (c) the fire-stability of the materials.

Up to now the research work has been widely scattered and generally the passages are not fire-proof even if the importance of the problem is perfectly grasped.

The invention has thus for an object to provide a method and a passage in which the simplicity of embodiment resulting in a dramatic efficiency is the leading line for the developed technique.

For this purpose according to the invention, use is made of a cushion which is fire-resistant enough, at least one surface of said cushion is covered with a fire-proof compound, said opening is closed with said cushion, a flange from fire-resisting material is arranged against at least one cushion surface for each element or element group, in such a way as to surround the element or element group, and the hollow space remaining inside the flange is filled with a fire-proof material.

In a variation, a fire-proof plaster is poured inside said flange.

In another variation, a fire-proof compound is poured inside said flange.

The invention also relates to passages for electric cables, ducts, pipes or sheaths which are provided according to the invention.

Other details and features of the invention will stand out from the description given below by way of non limitative example and with reference to the accompanying drawings, in which:

FIG. 1 is a front view of the passage of electric cables on three levels according to the invention.

FIG. 2 is a cross-section along line II—II in FIG. 1.

FIG. 3 is a lengthwise cross-section showing a step in the method according to the invention.

The method as shown in the drawings permits the construction of fire-proof passages, which can oppose the progress of a fire for a longer time and under better conditions. Said method further allows one to design such a passage under particularly favourable conditions according to a simple technique which makes logical use of the fire-resisting properties of the materials used.

There should first be noted that hereinafter the terms "fire-resisting" or "fire-proof" are used to mean those properties of said materials which enable same to resist to fire during a time period which corresponds to the particular requirements set by the law or those in charge of operation of the facility. It should also be noted that in the examples given hereinafter, the suggested dimensions or ratios have been given while taking into account that it is useless from the practical point of view to consider a fire resistance which outlasts substantially some limit. Anyway the arrangement and dimensions are given but to illustrate a single example.

When considering the cross-section shown in FIG. 2, it will be noted that it is of no importance whether the space on the right-hand side of wall 1 be the space which is to be subjected to fire first. With reference to this figure, it will be noted that wall 1 has an opening 2 which may have been provided when erecting same or made afterwards.

In the example shown, the one surface of wall 1 is provided with a cushion 3, which is comprised in this case of three layers of fire-proof material such as rockwool for example. The pressure of said three layers finds an explanation in the requirement of stiffening the cushion and it is clear that depending on the size thereof or the fire resistance required, use can be made of some other number of layers.

The various layers of the cushion are joined together by a fire-proof compound with which not only the surfaces to be engaged with one another but also the outer surfaces and notably the surface contacting wall 1, have been coated beforehand. It should not be forgotten that the fire-proof compound is a tacky material which acts both as adhesive and hardening material but which is flexible enough, and that it is thus useful to be able to cause the cushion to adhere to the wall.

The thickness of the layer of fire-proof compound which is used both for joining the various cushion layers and for coating the outer surfaces thereof, lies preferably in the range from 2 to 8 mm. The thickness of the outer layers is of course determined by the time during which the cushion should or will resist fire. Said cushion which is formed in this case by the junction of three layers of incombustible material has a thickness which is also a function of the requirements and notably of the mechanical steadiness of the cushion when piercing same of the passage of the elements, cables, sheaths and similar items.

The cushion 3 is held within a metal frame 4 which has a cross-section of Z-shape and is applied against the wall 1 with any suitable means, such as screws threaded into expansion plugs.

The cushion 3 retained inside frame 4 and adhering to the wall by means of the fire-proof compound it is coated with, is thus applied over the circumference of opening 2 and forms in this location a tight barrier against the progress of the flames which is of extreme importance. At this stage, the cushion 3 is pierced with a pointed metal rod to form a number of openings corresponding to the number of elements 5, such as cables, ducts or sheaths which have to go through the wall. Through said openings can pass either a single element or a group of such elements. The cables 5 or any other elements, are pulled through the openings which have thus been provided. It is possible with some techniques to make use of supports or cable-ways 6 from steel sheet which are arranged on either side of the cushion 3 or wall 1. In some cases, it has been suggested to line said supports or cable-ways 6 with asbestos cement cups 7. The supports concerned, when they are used, are of course fastened onto reinforcements which are not shown in the figures.

The elements or cables passing through the cushion 3 will be braced in every direction to leave a spacing letting the fire-proof compound or plaster enter those spaces remaining between said elements.

It is important to push back into the intervals all of the rock-wool fibres which might project on that cushion side opposite the side through which the elements have been introduced. If this were not done, there would be a danger of having irregularities which might endanger the tightness of the unit, which tightness is precisely to be obtained with an extremely simple method which results in a completely homogeneous structure.

On either side of the cushion 3, flanges 8 from fire-proof material coated with fire-resisting compound are applied on said cushion. Said flanges have a U-shaped cross-section and are integral with cushion 3 due to the compound with which all of said components (cushion and flanges) have been coated. It is of no consequence whether the flanges have been first coated or are coated afterwards, but it is important that the layer of fire-resisting compound be homogeneous and continuous. The thickness of the flange walls is again a function of the particular conditions met, but in the described example, the thickness thereof will lie between 30 and 60 mm.

When the flange has been arranged in position and becomes integral with the cushion 3, said flange is sealed at that end thereof which is opposite to the cushion by means of fire-proof compound 9 so as to form a cup between said compound plug 9 and cushion 3. Inside that space remaining in the flange is poured a fire-proof plaster 10. Those passages which are part of the levels in A and C have been so treated. The passage at level B is made by arranging or pouring inside the flange 8, said fire-proof compound which due to the consistency thereof, can slightly expand inside the flange and surround cables 5.

In the example as shown in FIG. 2, the flange 8 at level A can be thought of as a simple flange while the flanges 8 at levels B and C should to the contrary be considered as double flanges because the width thereof is larger.

In that same example shown in FIG. 2, the cushion has a feature of symmetry as to the right of the symmetry plane of cushion 3 (as seen in FIG. 2), there are found the same flanges and the same arrangement of fire-proof compound or plaster, but the experience has shown that such symmetry is not absolutely required and may be replaced by any embodiment with an unsymmetrical arrangement.

Whatever the type of flange used, said flanges are sealed at the top with something like a pad or cover 11 which is also made of incombustible material coated with fire-resisting compound. Said pads or covers become integral on the one hand with the top edge of flanges 8 and on the other hand with the side surface of cushion 3.

To insure the sealing the unit is completely finished by coating with a fire-resisting compound. The thickness of the fire-proof compound layer which finishes the unit formed by the cushion and the flanges can lie between 2 and 8 mm when it is desired to obtain a resistance to fire which fulfills the usual standards. However it will be noted again that larger thicknesses will give results allowing to oppose the fire progress during longer periods of time but which are often useless or at least not required by law.

The best results are obtained by making use of rockwool with a density of at least 100 kg per cubic meter.

It is clear that it is possible to use different types of flanges, that is flanges formed by two identical parts or substantially identical parts of U-shape. Such a flange type is particularly suitable when it is desired to obtain according to the same principles, a passage of vertical or substantially vertical elements through a horizontal or substantially horizontal wall. In such a case, there will be provided flanges forming a cup with a substantially vertical axis for receiving the fire-proof plaster or compound through an opening or duct located at the top.

There will be noted that the spacing in every direction between the elements or element groups through a cushion is extremely varying and it is not necessary for said spacing to be constant. It will also be noted that it is easy to go through cushion 3 with a pointed metal rod which forms openings which are quite suitable for the passage of one element or a plurality of elements. With the method as shown in FIG. 3, the fire-proof compound 9 (or plaster 10) can be poured inside flange 8 while the elements 5 will be braced by means of a pin 12 which cooperates with a jig 13. The pin 12 is removed after arranging between the various elements, fire-resisting parts 14.

The above description shows that the method according to the invention results in using the various materials under conditions which should be considered not only as optimum but rather as required if it is desired to fight with simple and economical means, the fire progress during periods of time which are at least equal to and often easily longer than those periods as required by law or by the master of the works.

The passage as shown in the drawings and described above is but one type of passage giving a resistance unknown up to now to the progress of fire from one location to another, through an opening provided in a partition.

The invention thus lies as defined above, in the use and the arrangement of materials which due to the proposed arrangements, provide a perfect fire tightness where the opening is provided in the wall, limit the temperatures to the values which are normally allowed as letting the insulating materials used retain the natural properties thereof in a maximized way, and insure for said materials an extended stability against the degrading of the mechanical structure thereof.

The dimensions when given are only by way of example and this is notably the case for the fire-proof compound layer shown in 14, and which is intended both to comprise the cushion 3 and to cover said cushion, the flanges 8 and the pads 11.

It must be understood that the invention is in no way limited to the above embodiments and that many changes can be brought therein without departing from the scope of the invention as defined by the appended claims.

For instance the word "flange" should mean an element of any suitable shape for forming about the elements 5, a space for retaining a fire-resisting or fire-proof material, and the word "cushion" means any stiff or flexible plate from fire-resisting or fire-proof material. When said plate is strong enough, the compound coating could be limited to those edges engaging the edges of said passage opening.

On the other hand in a variation for that case where elements 5 such as cables have been laid beforehand the cushion 3 could be "built-up" about said elements and this all the more easily when use is made of fire-proof compound for assembling the various parts of said cushion. The terms "lay the cusion against the wall or ceiling" can mean that the cusion is "glued" to the wall or ceiling by means of fire-proof compound.

The glueing of the cushion to the wall or ceiling is important as it does insure a remarkable tightness against fire which has not been noticed in any previous embodiment. However it is clear that the relatively fluid or thick fire-proof compound could be replaced by any sealing material or part, such as for instance a resilient gasket from substantially fire-resisting material which is pressed between the cushion and the edges of the passage opening for the elements.

The presence of the flanges enhances the tightness to hot gases and insures an increased heat insulation. This has a favourable influence on the resistance said flanges give to the temperature increase of the cable insulation and of the cables proper. As regards the conduction or the heat gradient, particularly surprising results are noted.

There results that the invention can be applied to any method or passage which makes use of said flange, whether the cushion is applied or not against the passage opening.

It is moreover possible to combine this invention with a size-reducing provided in the passage opening by means for example of a rigid cushion formed by one or a plurality of plates from a material known under the trade name "Pical" a well known material made from dehydrated asbestor cement.

I claim:

1. Method for passing through a wall or ceiling with elements such as electric cables, ducts, pipes, etc., whereby said wall has at least one passage opening for said elements, which comprises making use of a cushion which is fire-resistant, at least a portion of one surface of said cushion is covered with a fire-proof compound, said opening is closed with said cushion, a flange from fire-resisting material is arranged against at least one cushion surface for each element or element group, in such a way as to surround the element or element group, and the hollow space remaining inside the flange is filled with a fire-proof material.

2. Method as defined in claim 1, in which when the elements pass through a substantially vertical wall, said element is surrounded at the bottom and sidewise with a portion of cup-forming flange, the hollow space remaining inside said flange portion being filled with a fire-proof material.

3. Method as defined in claim 1, in which when the elements go through a ceiling or a substantially horizontal wall, use is made of a flange which is built-up about said element or element group by means of at least two parts forming together about said element or element group, a hollow space which is filled with a fire-proof material.

4. Method as defined in claim 1, in which after sealing said opening with the cushion, a number of said elements are passed through said cushion.

5. Method as defined in claim 1, in which after first arranging said elements passing through the wall inside said passage opening, before locating said cushion, said cushion is provided about said elements by arranging thereabout a plurality of parts the assembly of which forms said cushion.

6. Method as defined in claim 1, in which the cushion is applied against that wall or ceiling portion which surrounds said opening.

7. Method as defined in claim 4, in which said cushion is arranged inside a metal frame.

8. Method as defined in claim 5, in which a metal frame, is mounted about the cushion edges, said cushion being assembled about elements which go through said wall or ceiling.

9. Method as defined in claim 7, in which the metal frame is applied against said wall or ceiling.

10. Method as defined in claim 8, in which the frame mounted about said cushion is applied against said wall or ceiling.

11. Method as defined in claim 1, in which a fire-proof plaster is poured inside said flange.

12. Method as defined in claim 1, in which a fire-proof compound is poured inside said flange.

13. Method as defined in claim 2, in which the flange is completed by means of a fire-proof material part acting as pad or cover insuring a complete sheating.

14. Method as defined in claim 1, in which the flange is at least partly coated with a fire-proof compound.

15. Method as defined in claim 1, in which said elements going through said cushion are retained spaced by means of bracing parts from fire-proof material.

16. Method as defined in claim 15, in which the bracing of said elements is obtained by arranging along one direction a jig in parallel relationship with an element row and by guiding inside said jig provided with openings therefor, a pin which braces the elements along a direction at right angle to said first direction, the pin being removed after introducing said fire-proof plaster or compound and after locating between said elements a bracing part from fire-proof material.

17. Method as defined in claim 1, in which the flanges and the cushion are coated with a layer of fire-proof compound with a thickness from 2 to 8 mm.

18. Passage for the fire-proof passing of elements such as electric cables, ducts, pipes, etc., which comprises a cushion from fire-proof material which is coated with a fire-resisting compound, a number of openings provided in said cushion, and at least one flange of fire-proof material coated with fire-resisting compound, said flange being positioned against said cushion, and fire-proof material for filling the space between said flange and the elements.

19. Passage as defined in claim 18, in which said cushion is clamped inside a metal frame.

20. Passage as defined in claim 19, in which said frame is of Z-shape in cross-section.

21. Passage as defined in claim 18, in which the fire-proof material comprising said cushion is rock wool.

22. Passage as defined in claim 21, in which said rock wool has a mean density of at least 100 kg per cubic meter.

23. Passage as defined in claim 18, in which said cushion from fire-proof material has a thickness from about 100 to 200 mm.

24. Passage as defined in claim 18, in which said cushion from fire-proof material is comprised of at least two layers of fire-proof material joined together with a fire-resisting compound and with at least one exposed surface thereof coated with a fire-resisting compound.

25. Passage as defined in claim 19, in which the fire-resisting compound has a layer thickness from about 2 to 8 mm.

* * * * *